(12) United States Patent
Lee

(10) Patent No.: US 9,297,962 B2
(45) Date of Patent: Mar. 29, 2016

(54) MONO-BLOCK TYPE OPTICAL FIBER ADAPTER

(71) Applicant: ALLIANCE FIBER OPTIC PRODUCTS, INC., New Taipei (TW)

(72) Inventor: Wei-Cheng Lee, New Taipei (TW)

(73) Assignee: Alliance Fiber Optic Products, Inc., New Taipei (TW)

( * ) Notice: Subject to any disclaimer, the term of this patent is extended or adjusted under 35 U.S.C. 154(b) by 381 days.

(21) Appl. No.: 13/942,882

(22) Filed: Jul. 16, 2013

(65) Prior Publication Data

US 2014/0147082 A1    May 29, 2014

Related U.S. Application Data

(60) Provisional application No. 61/796,843, filed on Nov. 23, 2012.

(51) Int. Cl.
*G02B 6/36* (2006.01)
*G02B 6/38* (2006.01)

(52) U.S. Cl.
CPC .................................. *G02B 6/3825* (2013.01)

(58) Field of Classification Search
None
See application file for complete search history.

(56) References Cited

U.S. PATENT DOCUMENTS

| | | | | |
|---|---|---|---|---|
| 6,347,888 B1 * | 2/2002 | Puetz | | 385/53 |
| 6,461,054 B1 * | 10/2002 | Iwase | | 385/73 |
| 7,029,322 B2 * | 4/2006 | Ernst et al. | | 439/544 |
| 7,198,409 B2 * | 4/2007 | Smith et al. | | 385/53 |
| 8,794,851 B2 * | 8/2014 | Jibiki et al. | | 385/75 |
| 2006/0154529 A1 * | 7/2006 | Erdman et al. | | 439/654 |
| 2006/0204200 A1 * | 9/2006 | Lampert et al. | | 385/139 |
| 2014/0016901 A1 * | 1/2014 | Lambourn et al. | | 385/75 |
| 2014/0072263 A1 * | 3/2014 | Hung et al. | | 385/60 |

* cited by examiner

*Primary Examiner* — Tina Wong
(74) *Attorney, Agent, or Firm* — Rosenberg, Klein & Lee

(57) ABSTRACT

A mono-block type optical fiber adapter includes an adapter body including a partition wall between each two opposing accommodation chambers and a tubular coupling portion extended from each partition wall toward the inside of one respective front-sided accommodation chamber, a ferrule mounted in each tubular coupling portion and partially suspending in the respective rear-sided accommodation chamber, and a ferrule holder respectively mounted in each rear-sided accommodation chamber and attached to the suspended rear end of the respective ferrule. The one piece design of the adapter body facilitates mass production and effectively eliminates the dimensional tolerance and clearance problems of conventional designs. Further, the matching design between the adapter body and the ferrule holders facilitates quick and accurate installation of the mono-block type optical fiber adapter, saving much installation time and labor and enhancing structural stability and reliability.

12 Claims, 20 Drawing Sheets

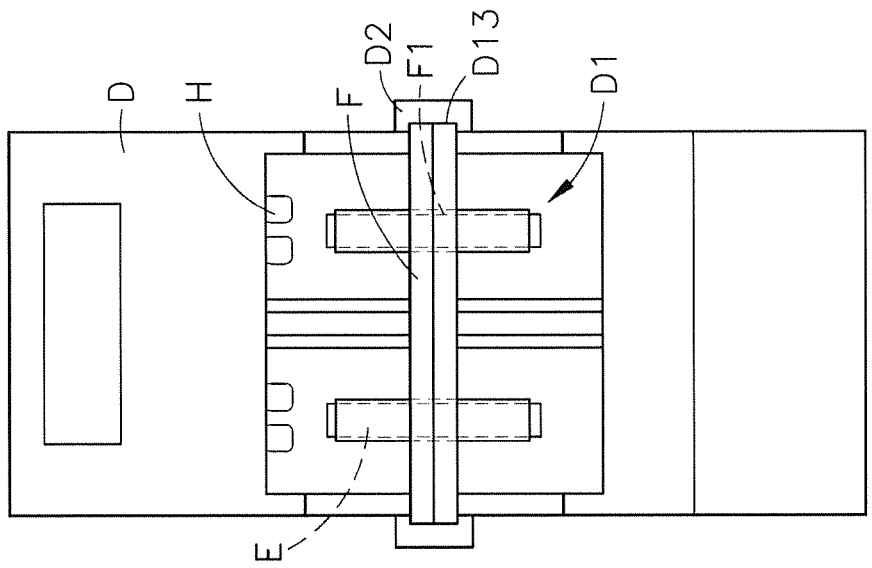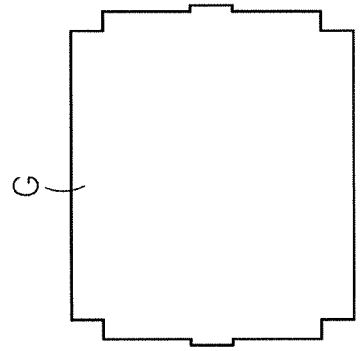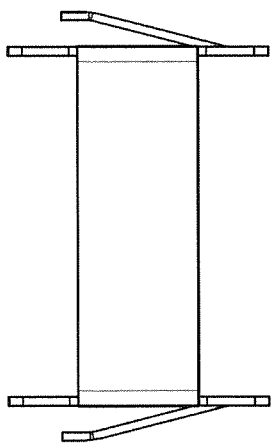
PRIOR ART
FIG. 19

MONO-BLOCK TYPE OPTICAL FIBER ADAPTER

This reference is based on Provisional Application Ser. No. 61/796,843, filed 23 Nov. 2012.

BACKGROUND OF THE INVENTION

1. Field of the Invention

The present invention relates to optical fiber technology, and more particularly to a mono-block type mono-block type optical fiber adapter, which comprises an adapter body that comprises a partition wall between each two opposing accommodation chambers and a tubular coupling portion extended from each partition wall toward the inside of one respective front-sided accommodation chamber, a ferrule mounted in each tubular coupling portion and partially suspending in the respective rear-sided accommodation chamber, and a ferrule holder respectively mounted in each rear-sided accommodation chamber and attached to the suspended rear end of the respective ferrule.

2. Description of the Related Art

Following fast development of communication and internet technology, telephone and network facilities are widely used for data transmission and real time communication, bringing great convenience to people. In a communication system, cables are used for transmitting electrical signal or optical signal. The transmission of optical signal is faster than the transmission of electrical signal. Optical fiber cables are commonly used for transmitting optical signal. Further, optical fiber cables have the advantages of strong anti-electromagnetic interference anti-noise ability, wide bandwidth, light weight, long distance transmission and good privacy.

Further, many different types of optical fiber connectors are commercially available. The most widely used optical fiber connectors are SC (subscriber/square/standard) connectors and LC (lucent/local/little) connectors. A LC (lucent/local/little) connector shrinks the size of ferrules to 1.25 mm in diameter with a fiber pitch of 6.25 mm. Two LC simplex connectors can be joined to form a duplex connector. LC optical fiber connectors are low cost, reliable and can be easily installed to terminate fiber optic cables. Further, LC optical fiber connectors provide simplex and duplex transmission flexibility.

Further, mono-block type optical fiber adapters are equipped with ferrules for alignment and connection between mating optical fiber connectors. These ferrules can be made of ceramics or copper, and are adapted to act as alignment mechanisms. They have the advantages of high dimensional precision, high mechanical durability, low insertion loss and low reflective loss, minimizing optical signal loss. As shown in FIG. 12, a conventional optical fiber adapter is a two-piece design, comprising a front shell member A, a rear shell member B, and two ferrules C. The front shell member A and the rear shell member B each comprise two accommodation chambers A1/B1, two side wings A2/B2 respectively bilaterally disposed at the rear side thereof, and two locating holes A11/B11 located on the back wall thereof. The two ferrules C are respectively inserted through the locating holes A11/B11. Further, the front shell member A and the rear shell member B are joined together, and then the side wings A2/B2 are bonded together by ultrasonic welding. During application, optical fiber connectors are respectively mounted in the accommodation chambers A1/B1, and the optical fiber cores of the optical fiber connectors are respectively aligned and connected in the ferrules C for transmitting optical signals.

According to aforesaid prior art design, the front shell member A and the rear shell member B are separately made using different molds. In consequence, the level of inconvenience and difficulty in designing the molds is relatively increased. Further, after the front shell member A and the rear shell member B are attached together, an ultrasonic welding technique shall be employed to bond the side wings A2/B2 together. During installation of this prior art design, dimensional tolerance and clearance problems may occur. Further, this prior art design does not facilitate mass production, resulting in increased labor cost.

FIGS. 13-15 illustrate another two prior art optical fiber adapter designs. According to these two prior art designs, the adapter body (body shell) D of the optical fiber adapter defines therein a plurality of opposing accommodation chambers D1 at two sides, a partition wall D11 in each two opposing accommodation chamber D1, and two tubular coupling portions D12 respectively extended from two opposite sides of each partition wall D11 into the respective opposing accommodation chambers D1 for accommodating one respective ferrule E in an axial accommodation hole D121 in the two tubular coupling portions D12. According to these two prior art designs, the adapter body D is an one-piece member, and the fabrication of the adapter body D eliminates the ultrasonic welding process as employed in the prior art design shown in FIG. 12. Further, each tubular coupling portion D12 has two or three longitudinal crevices D122 that enhance the elastically deformable ability of the respective tubular coupling portion D12 to facilitate installation of the respective ferrule E. However, if the adapter body D is made of metal, the longitudinal crevices D122 cannot significantly enhance the elastically deformable ability of the respective tubular coupling portion D12 to facilitate installation of the respective ferrule E.

Referring to FIGS. 16 and 17, still another prior art design of optical fiber adapter is shown. According to this design, the adapter body of the optical fiber adapter is a two-piece design, comprising a body shell D and a ferrule holder F. The ferrule holder F is mounted in two adjacent accommodation chambers D1 in the front side of the body shell D and fastened to a locating groove D13 inside the body shell D between the two front-sided accommodation chambers D1. Further, two ferrules E are respectively mounted in the two rear-sided accommodation chambers D1 in the rear side of the body shell D and respectively inserted into respective locating tubes F1 of the ferrule holder F. According to this prior art design of optical fiber adapter, the body shell D can be selectively made out of metal or plastics. If the body shell D is made out of metal, the ferrule holder F can conveniently and accurately mounted in the locating groove D13 inside the body shell D. However, if the body shell D is made out of plastics, frequently plugging and unplugging mating optical fiber connectors can cause loosening or displacement of the ferrule holder F, lowering structural stability and optical fiber connector positioning accuracy.

FIGS. 18-20 illustrate still another design of optical fiber adapter according to the prior art. According to this design, the adapter body of the optical fiber adapter is a three-piece device, comprising a body shell D, a ferrule holder F and a cover member G. The ferrule holder F is formed of two abutted plate members, comprising two tubular coupling portions F1 respectively extended from each of the two plate members and respectively suspending in respective accommodation chambers D1 of the body shell D. Further, two ferrules E are respectively positioned in the tubular coupling portions F1 of the abutted plate members and kept in parallel. The ferrule holder F is mounted in a mounting hole D13 on the middle of the body shell D. The cover member G is covered on the body shell D over the ferrule holder F. Further, shutters H are provided in the accommodation chambers D1 of the body shell D corresponding to the ferrules E. According to this design, the ferrule holder F can be vertically conveniently mounted in the mounting hole D13 of the body shell D. Further, the ferrule holder F loading direction is perpendicular to the extending direction of the accommodation chambers D1. Thus, plugging optical fiber connectors into the ferrules E or unplugging optical fiber connectors from the ferrules E does not generate any drag force or pulling force to the ferrule holder F to cause loosening or displacement of the ferrule holder F. However, because this prior art design of optical fiber adapter is formed of multiple component parts, it has a complicated structure that does not facilitate mass production. Further, the installation of this prior art design of optical fiber adapter requires much labor and time.

Therefore, it is desirable to provide an optical fiber adapter that eliminates the drawbacks of the aforesaid various prior art designs.

SUMMARY OF THE INVENTION

The present invention has been accomplished under the circumstances in view. It is therefore the main object of the present invention to provide a mono-block type mono-block type optical fiber adapter, which eliminates the drawbacks of the aforesaid prior art designs.

To achieve this and other objects of the present invention, a mono-block type mono-block type optical fiber adapter of the present invention comprises an adapter body that comprises a partition wall between each two opposing accommodation chambers and a tubular coupling portion extended from each partition wall toward the inside of one respective front-sided accommodation chamber, a ferrule mounted in each tubular coupling portion and partially suspending in the respective rear-sided accommodation chamber, and a ferrule holder respectively mounted in each rear-sided accommodation chamber and attached to the suspended rear end of the respective ferrule. The one piece design of the adapter body facilitates mass production and effectively eliminates the dimensional tolerance and clearance problems of conventional designs. Further, the matching design between the adapter body and the ferrule holders facilitates quick and accurate installation of the mono-block type optical fiber adapter, saving much installation time and labor and enhancing structural stability and reliability.

Preferably, the adapter body further comprises two sliding grooves bilaterally and axially disposed in each rear-sided accommodation chamber, and a plurality of escape holes respectively cut through two opposing lateral walls and a bottom wall thereof in communication with the rear-sided accommodation chambers, an inside stop surface portion respectively defined in each rear-sided accommodation chamber between an inner end of each sliding groove and one respective escape hole. Further, each ferrule holder comprises two springy hook blocks symmetrically located at two opposite lateral sides of a flat base frame thereof and respectively movable over one respective inside stop surface portion of the adapter body into one respective escape hole of the adapter body to secure the ferrule holder to the adapter body firmly.

The mono-block type optical fiber adapter further comprises a positioning member fastened to the adapter body for securing the adapter body to an external equipment. The adapter body and the positioning member are preferably made out of metal so that the mono-block type optical fiber adapter can provides an excellent EMI (electromagnetic interference) and RFI (radio frequency interference) shielding effect to effectively suppress the energy of electromagnetic waves or radio frequency that passes through the adapter body into the inside of the housing of the optical fiber equipment in which the mono-block type optical fiber adapter is installed and to prevent interference between electronic components in the housing of the optical fiber equipment, improving optical signal transmission quality and reliability.

Other advantages and features of the present invention will be fully understood by reference to the following specification in conjunction with the accompanying drawings, in which like reference signs denote like components of structure.

BRIEF DESCRIPTION OF THE DRAWINGS

FIG. 19 is an exploded top view of the optical fiber adapter shown in FIG. 18.

DETAILED DESCRIPTION OF THE PREFERRED EMBODIMENT

Figure 1:
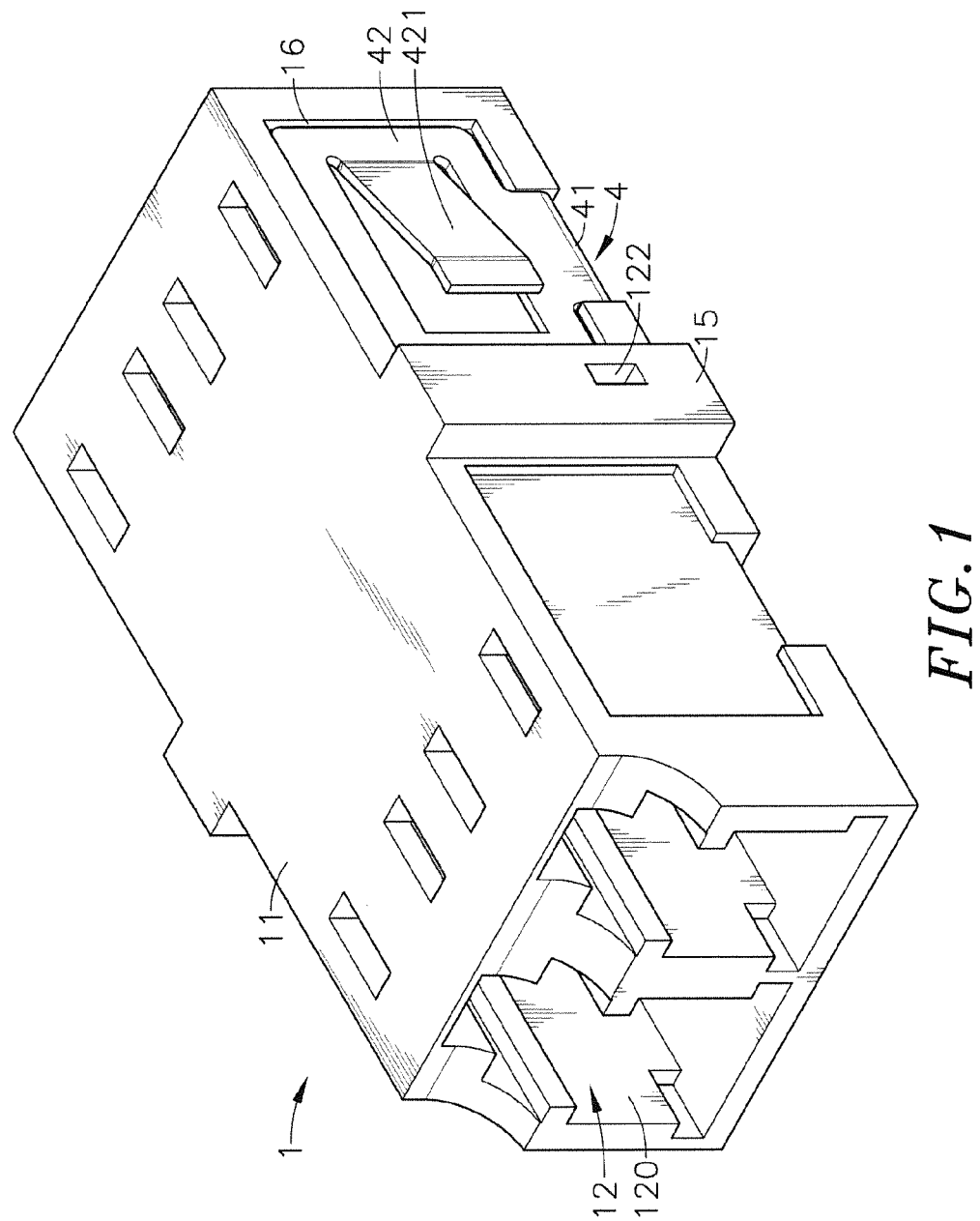
FIG. 1 is an oblique top elevational view of a mono-block type optical fiber adapter in accordance with a first embodiment of the present invention.
Figure 2:
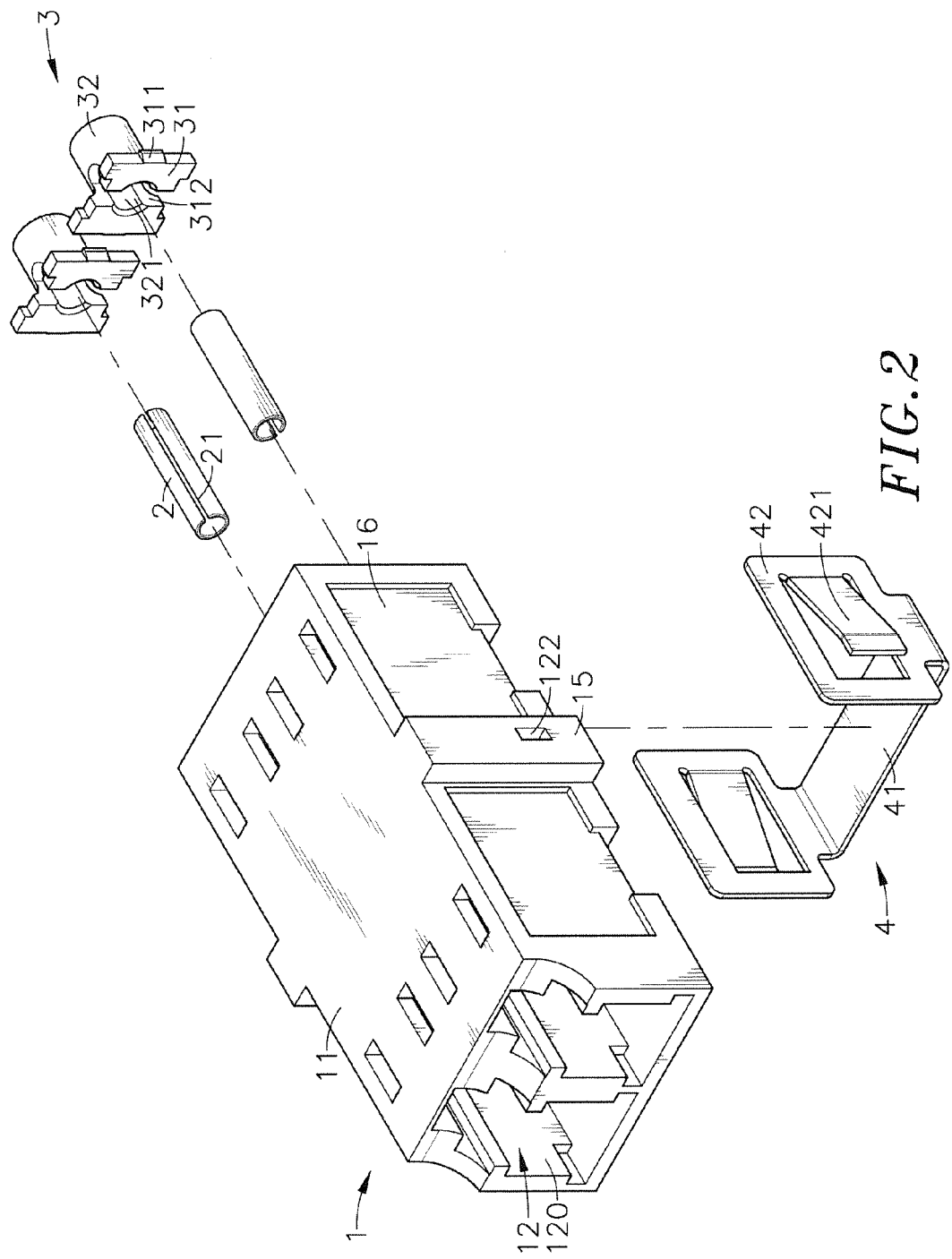
FIG. 2 is an exploded view of the mono-block type optical fiber adapter in accordance with the present invention.
Figure 3:
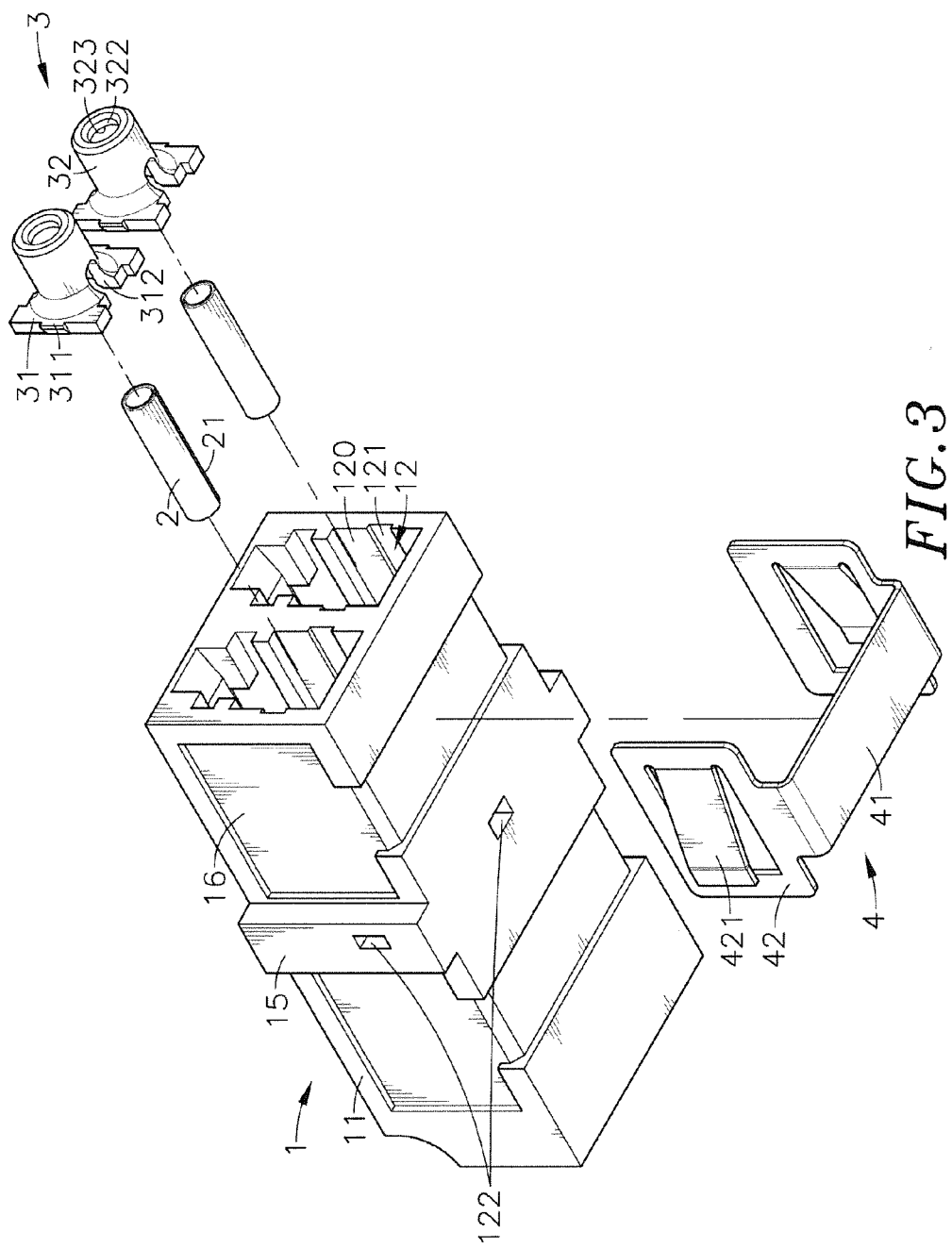
FIG. 3 corresponds to FIG. 1 when viewed from another angle.
Figure 4:
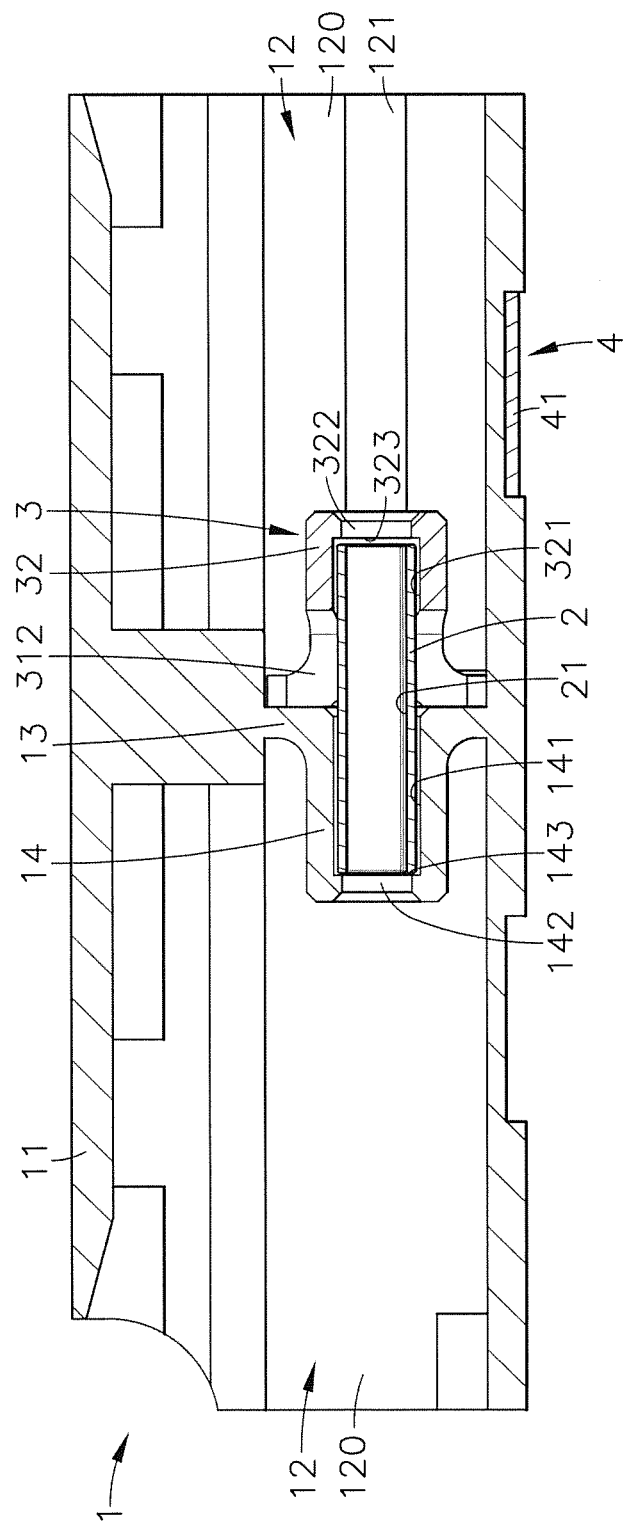
FIG. 4 is a sectional side view of the mono-block type optical fiber adapter in accordance with the first embodiment of the present invention.

Referring to FIGS. 1-4, a mono-block type optical fiber adapter in accordance with a first embodiment of the present invention is shown. The mono-block type optical fiber adapter comprises an adapter body 1, a plurality of ferrules 2, a plurality of ferrule holders 3, and a positioning member 4.

The adapter body 1 comprises a body shell 11, at least one, for example, two pairs of opposing accommodation chambers 12 (i.e., one front-sided accommodation chamber and one rear-sided accommodation chamber) respectively defined in opposing front and rear sides of the body shell 11, a partition wall 13 defined inside the body shell 11 between the two opposing accommodation chambers 12 of each one same pair, an insertion hole 120 disposed in communication between each accommodation chamber 12 and the surroundings, a tubular coupling portion 14 extended from each partition wall 13 toward the inside of one respective front-sided accommodation chamber 12 and defining therein an axially extending passage hole 141 that cuts through the respective partition wall 13, a reduced orifice 142 in a front end thereof in communication between the axially extending passage hole 141 and the associating accommodation chamber 12 and an inside annular stop edge 143 disposed between the axially extending passage hole 141 and the reduced orifice 142, two sliding grooves 121 bilaterally and axially disposed in each rear-sided accommodation chamber 12, a plurality of escape holes 122 respectively cut through two opposing lateral walls and a bottom wall thereof in communication with the rear-sided accommodation chamber 12, an inside stop surface portion 1211 respectively defined in each rear-sided accommodation chamber 12 between an inner end of each sliding groove 121 and one respective escape hole 122, at least one, for example, two wings 15 respectively and perpendicularly extended from two opposing lateral walls thereof corresponding to the partition walls 13, and a plurality of recessed portions 16 respectively located at the two opposing lateral walls and the bottom wall and kept in communication with one another.

The ferrules 2 are split tubes made of ceramics, copper, nickel, or any other suitable metal or non-metal material, each defining a longitudinal split 21 that cuts through the wall thickness of the respective ferrule and extends through opposing front and rear ends of the respective ferrule.

Each ferrule holder 3 comprises a flat base frame 31, two springy hook blocks 311 symmetrically located at two opposite lateral sides of the flat base frame 31, a coupling tube 32 perpendicularly extended from one side of the flat base frame 31 at the center, an accommodation hole 321 axially extending through the flat base frame 31 and the coupling tube 32, and a crevice 312 cut through a middle part of the flat base frame 31 across one end of the accommodation hole 321, an orifice 322 defined in a front end of the coupling tube 32 remote from the flat base frame 31 and disposed in axial alignment and communication with the accommodation hole 321, and an inside annular stop edge 323 disposed between the accommodation hole 321 and the orifice 322.

The positioning member 4 is a substantially U-shaped frame member fastened to the recessed portions 16 of the adapter body 1, comprising a flat base panel 41, two side arms 42 respectively extended from two opposite lateral sides of the flat base panel 41 at right angles, and two retaining strips 421 respectively and obliquely backwardly extended from the two side arms 42.

According to this embodiment, the adapter body 1 is made out of a plastic material by insert molding. Alternatively, copper, zinc alloy or any other metal material can be selectively used to make the adapter body 1, providing better EMI (electromagnetic interference) protection. Further, the ferrule holders 3 can be made out of a plastic material by insert molding. However, these component fabrication are simply examples of the present invention for the purpose of understanding the scope and spirit of the invention but not intended for use as limitations.

Figure 5:
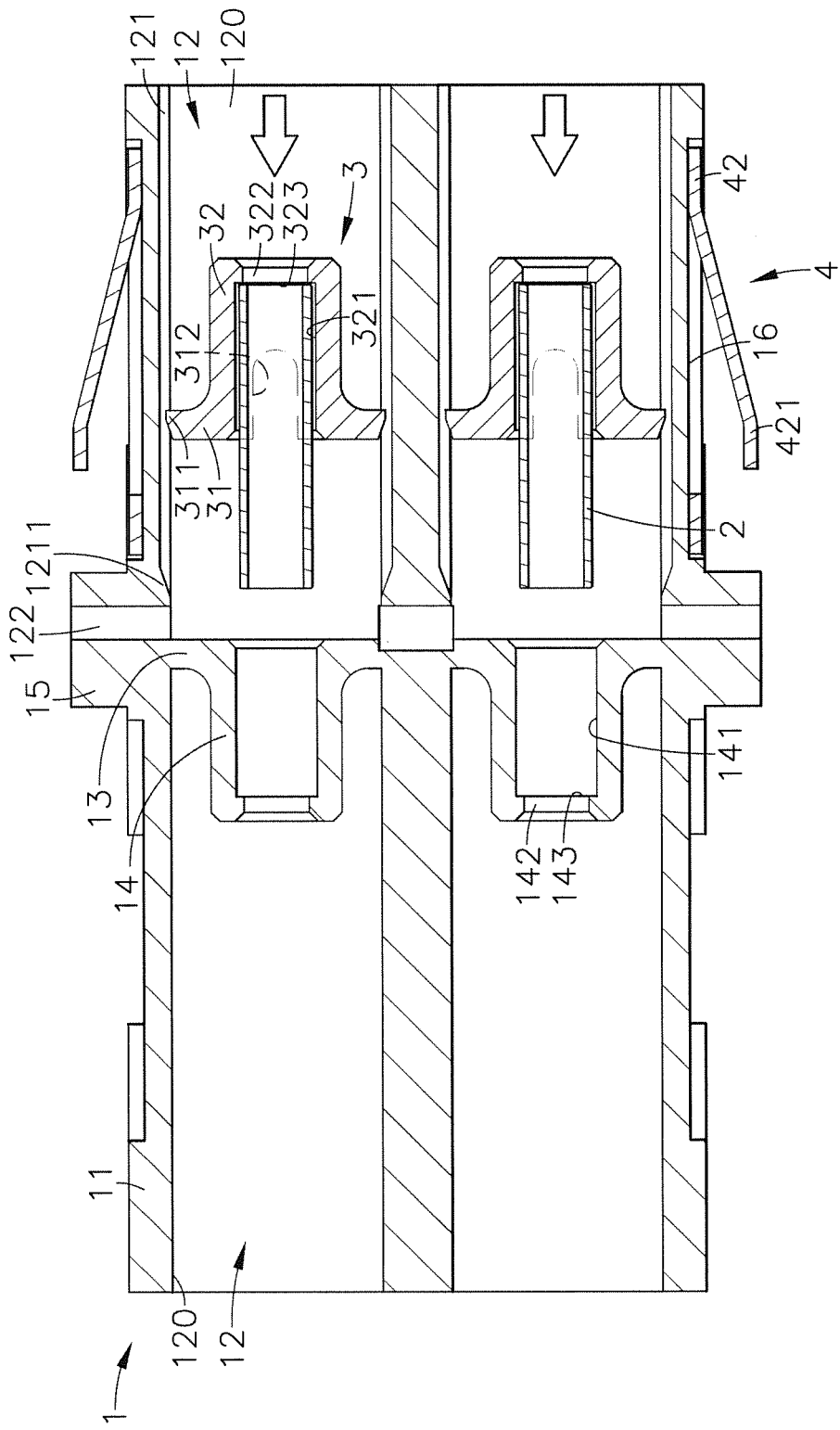
FIG. 5 is a schematic sectional top view of the first embodiment of the present invention, illustrating the ferrule holder installation procedure (I).
Figure 6:
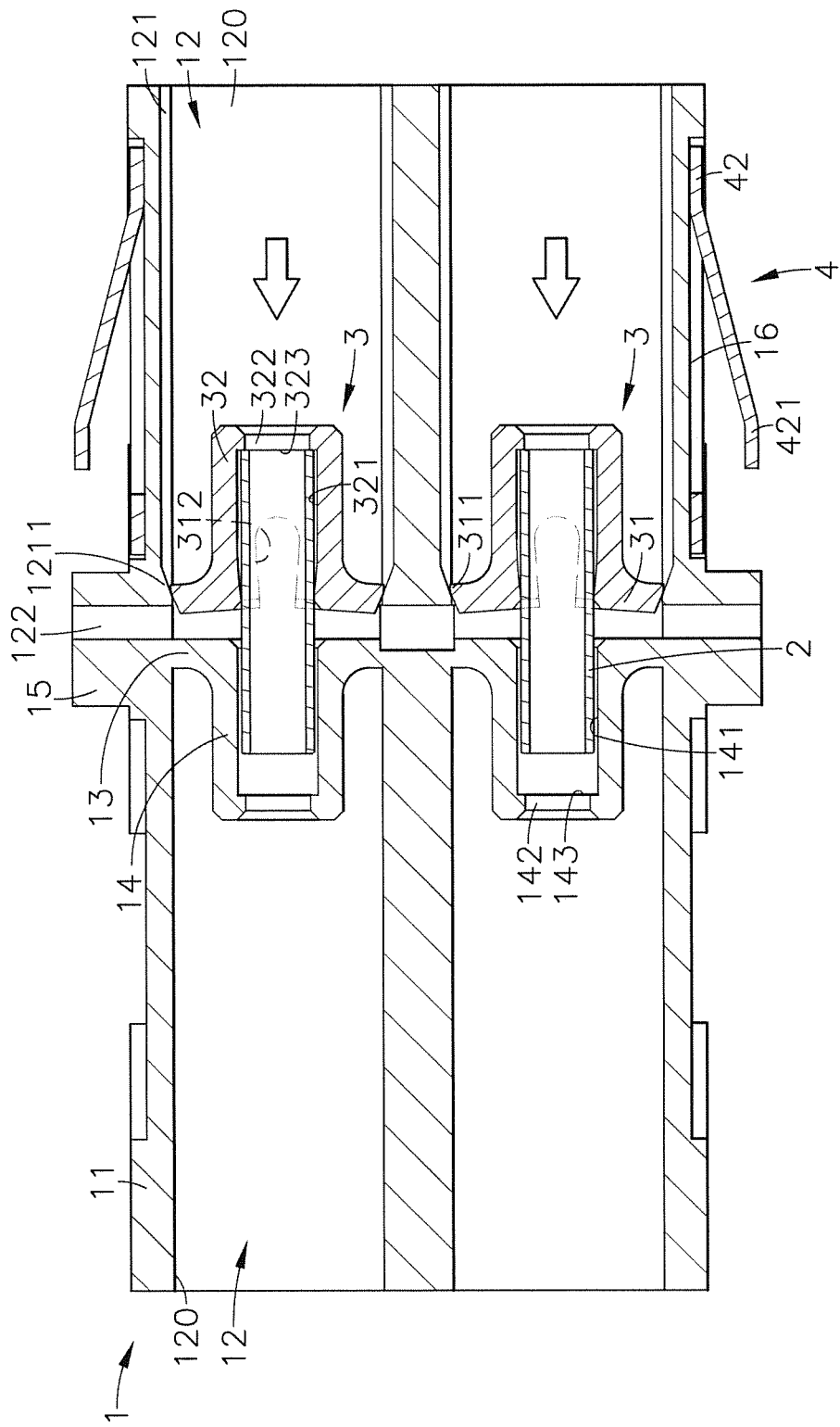
FIG. 6 is a schematic sectional top view of the first embodiment of the present invention, illustrating the ferrule holder installation procedure (II).
Figure 7:
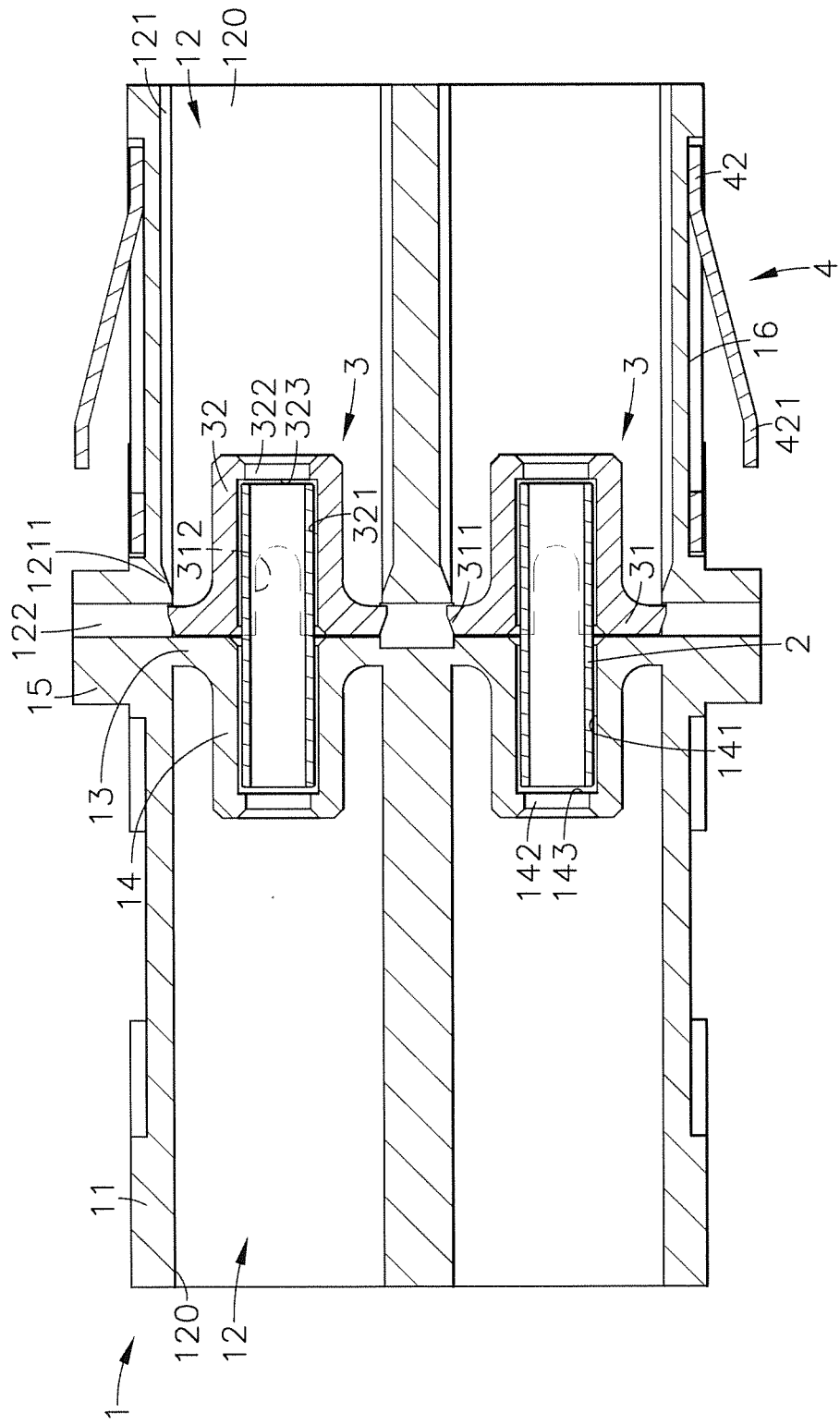
FIG. 7 is a schematic sectional top view of the first embodiment of the present invention, illustrating the ferrule holder installation procedure (III).

Referring to FIGS. 5-7, when assembling the mono-block type optical fiber adapter, insert the ferrules 2 into the accommodation holes 321 of the coupling tube 32 of the respective ferrule holders 3 and stopped against the inside annular stop edges 323 of the coupling tubes 32 of the respective ferrule holders 3. Then, the ferrule holders 3 are inserted into the rear-sided accommodation chambers 12 to slidably couple the springy hook blocks 311 of each ferrule holder 3 to the respective sliding grooves 121 in the respective rear-sided accommodation chamber 12 and to force the springy hook blocks 311 of each ferrule holder 3 against the associating inside stop surface portion 1211 and to push the ferrules 2 respectively into the axially extending passage holes 141 of the tubular coupling portions 14 in the adapter body 1 to have the ferrules 2 be respectively stopped at the inside annular stop edges 143 of the respective tubular coupling portions 14.

Alternatively, respectively insert the ferrules 2 are respectively inserted from the rear-sided accommodation chambers 12 into the axially extending passage holes 141 of the tubular coupling portions 14 in the adapter body 1 to have the ferrules 2 be respectively stopped at the inside annular stop edges 143 of the respective tubular coupling portions 14. At this time, the ferrules 2 are positively positioned in the respective tubular coupling portions 14 and partially extended out of the respectively tubular coupling portions 14 and suspending in the respective rear-sided accommodation chambers 12 for the mounting of the ferrule holders 3.

Thereafter, respectively insert the ferrule holders 3 into the rear-sided accommodation chambers 12 to slidably couple the springy hook blocks 311 of each ferrule holder 3 to the respective sliding grooves 121 in the respective rear-sided accommodation chamber 12 and to further force the springy hook blocks 311 of each ferrule holder 3 against the associating inside stop surface portion 1211. When continuously pushing each ferrule holder 3 forward, the springy hook blocks 311 will be elastically deformed and moved over the associating inside stop surface portion 1211 into the respective escape holes 122. After entered the respective escape holes 122, the springy hook blocks 311 immediately return to their former shape to hook up with the associating inside stop surface portion 1211, holding the flat base frame 31 of the respective ferrule holder 3 in abutment against the respective partition wall 13. At this time, the coupling tube 32 of each ferrule holder 3 is kept in axial alignment with the respective tubular coupling portion 14, and the part of each ferrule 2 that suspends in the respective rear-sided accommodation chamber 12 is positioned in the accommodation hole 321 of the coupling tube 32 of the respective ferrule holder 3 and stopped against the inside annular stop edge 323 of the coupling tube 32 of the respective ferrule holder 3. Thus, the two opposite ends of each ferrule 2 are respectively and positively positioned in the axially extending passage hole 141 of the respective tubular coupling portion 14 of the adapter body 1 and the accommodation hole 321 of the coupling tube 32 of the respective ferrule holder 3 for receiving the optical fiber cores of mating pairs of optical fiber connectors and guiding them into abutment for transmitting optical signals.

Thus, the invention simply requires one single mold to make the adapter body 1, lowering the level of inconvenience and difficulty in designing the mold and eliminating further ultrasonic welding. The one piece design of the adapter body 1 facilitates modularized mass production and effectively eliminates the dimensional tolerance and clearance problems and the drawbacks of expensive and complicated manufacturing process as commonly seen in the prior art designs. Further, the matching design between the adapter body 1 and the ferrule holders 3 facilitates quick and accurate installation of the mono-block type optical fiber adapter, saving much installation time and labor and enhancing structural stability and reliability. Further, frequently plugging and unplugging optical fiber connectors will neither damage the ferrules 2 or the ferrule holders 3 nor cause displacement of the ferrules 2. Therefore, the invention has the advantages of high level of structural stability, ease of installation, mass production feasibility and low cost.

Figure 8:
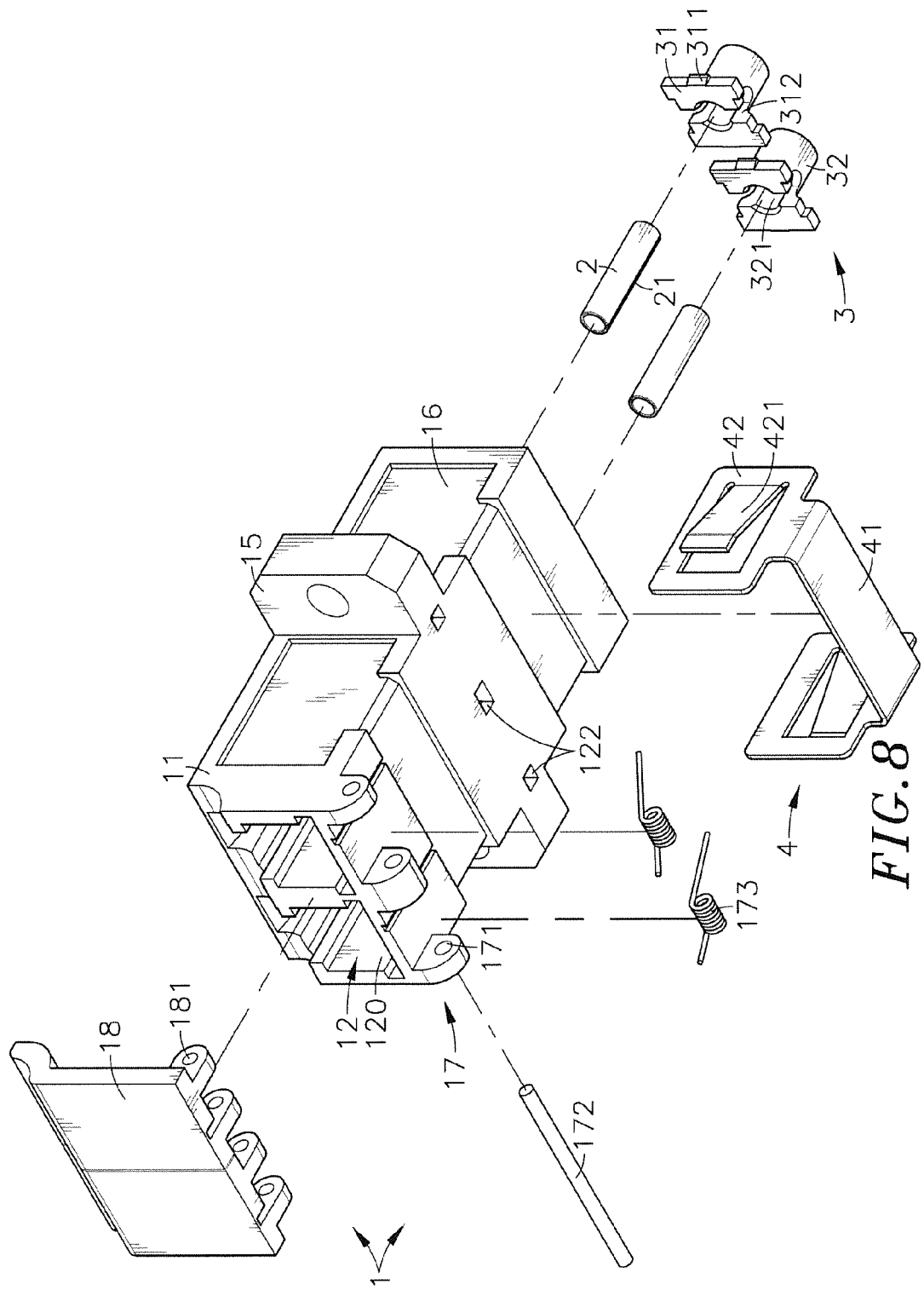
FIG. 8 is an exploded view of a mono-block type optical fiber adapter in accordance with a second embodiment of the present invention.
Figure 9:
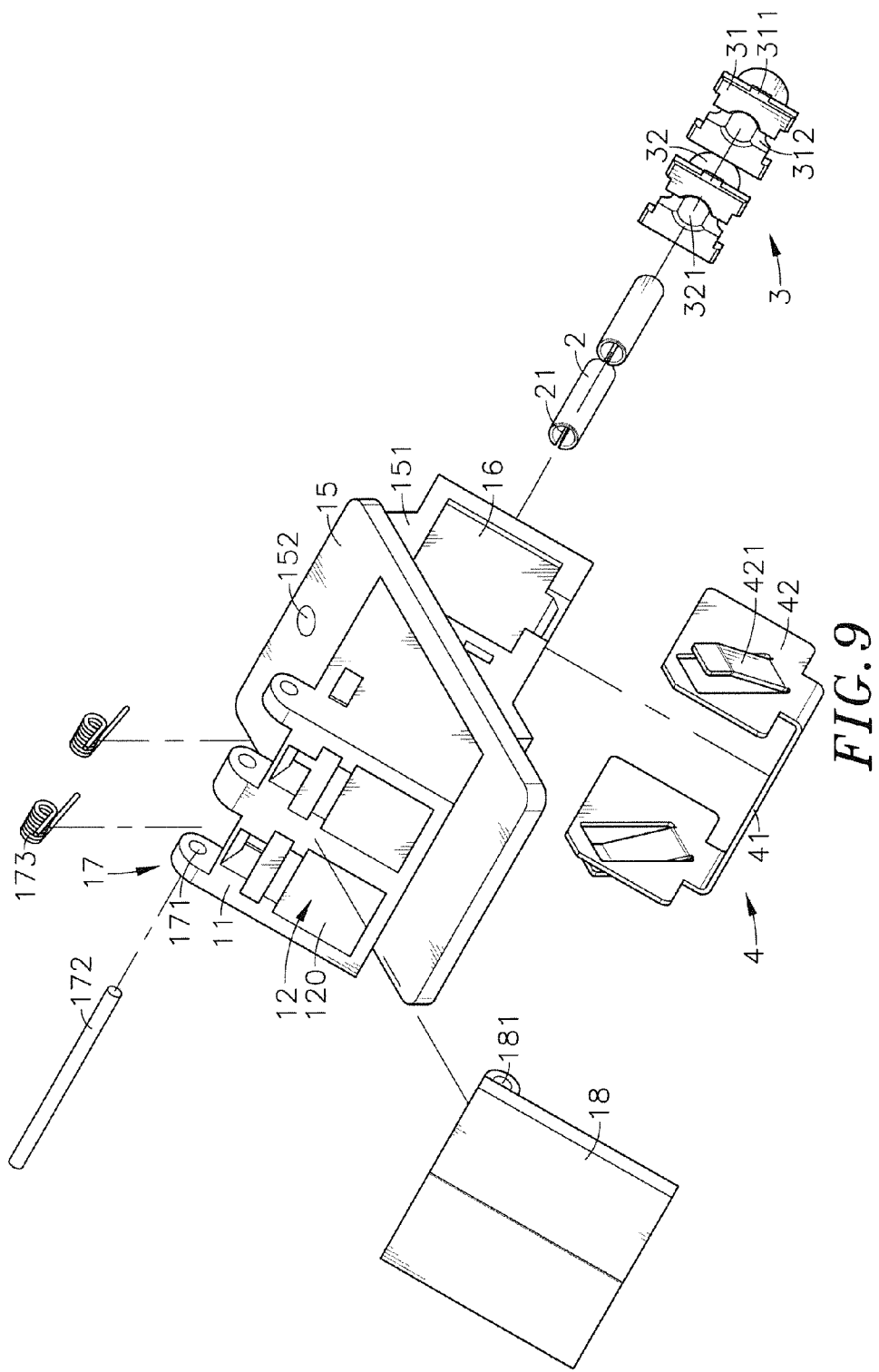
FIG. 9 is an exploded view of an alternate form of the mono-block type optical fiber adapter in accordance with the second embodiment of the present invention.

Referring to FIGS. 8 and 9, a mono-block type optical fiber adapter in accordance with a second embodiment of the present invention is shown. This second embodiment is substantially similar to the aforesaid first embodiment with the exception of the following features. According to this second embodiment, the adapter body 1 further comprises a pivot unit 17 located at a front bottom side thereof adjacent to the insertion holes 120, and a dust cover 18 pivotally coupled to the pivot unit 17 and normally held by the pivot unit 17 in a closed position where the dust cover 18 covers the insertion holes 120 against outside dust. The pivot unit 17 comprises a plurality of axle holder blocks 171 arranged at the front bottom side of the adapter body 1 in a line, an axle 172 transversely fastened to the axle holder blocks 171, and a plurality of torsion springs 173 mounted on the axle 172 and stopped between the bottom wall of the adapter body 1 and the dust cover 18 to hold the dust cover 18 in the normally closed position. The dust cover 18 comprises a plurality of barrels 181 aligned in a line at a bottom side thereof and pivotally coupled to the axle 172 for allowing the dust cover 18 to be turned about the axle 172 between an open position and the aforesaid normally closed position. Alternatively, the axle holder blocks 171 can be arranged at the front top side of the adapter body 1, and the barrels 181 of the dust cover 18 can be arranged in a line at the top side of the dust cover 18 and pivotally coupled to the axle 172 that is fastened to the axle holder blocks 171.

Further, the aforesaid wings 15 of the adapter body 1 are not requisite components and can be eliminated. Further, the wings 15 can also be variously configured. For example, in FIG. 8, the wings 15 extend perpendicularly relative to the extending direction of the accommodation chambers 12, and define with the axis of each accommodation chamber 12, a 90° contained angle. In FIG. 9, the single piece wing 15 extends around the periphery of the adapter body 1 and defines with the axis of each accommodation chamber 12 a 45° contained angle, comprising two stepped block portions 151 respectively connected to the periphery of the adapter body 1 at two opposite sides and a mounting hole 152 located near a top side thereof; the two retaining strips 421 of the positioning member 4 are respectively extended from the side arms 42 in direction toward the single piece wing 15.

Figure 10:
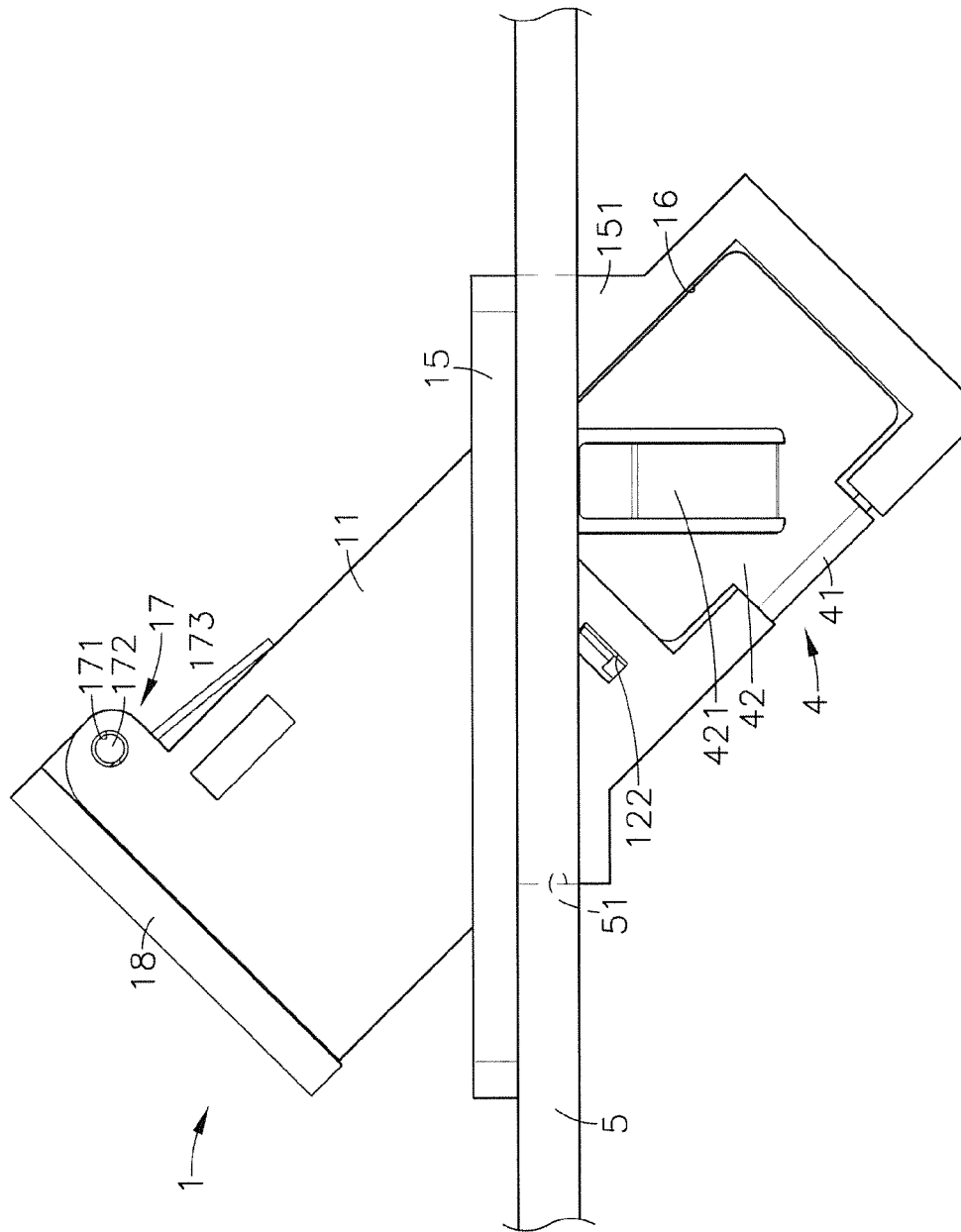
FIG. 10 is a schematic applied view of the present invention, illustrating the mono-block type optical fiber adapter installed in a housing of an optical fiber equipment.
Figure 11:
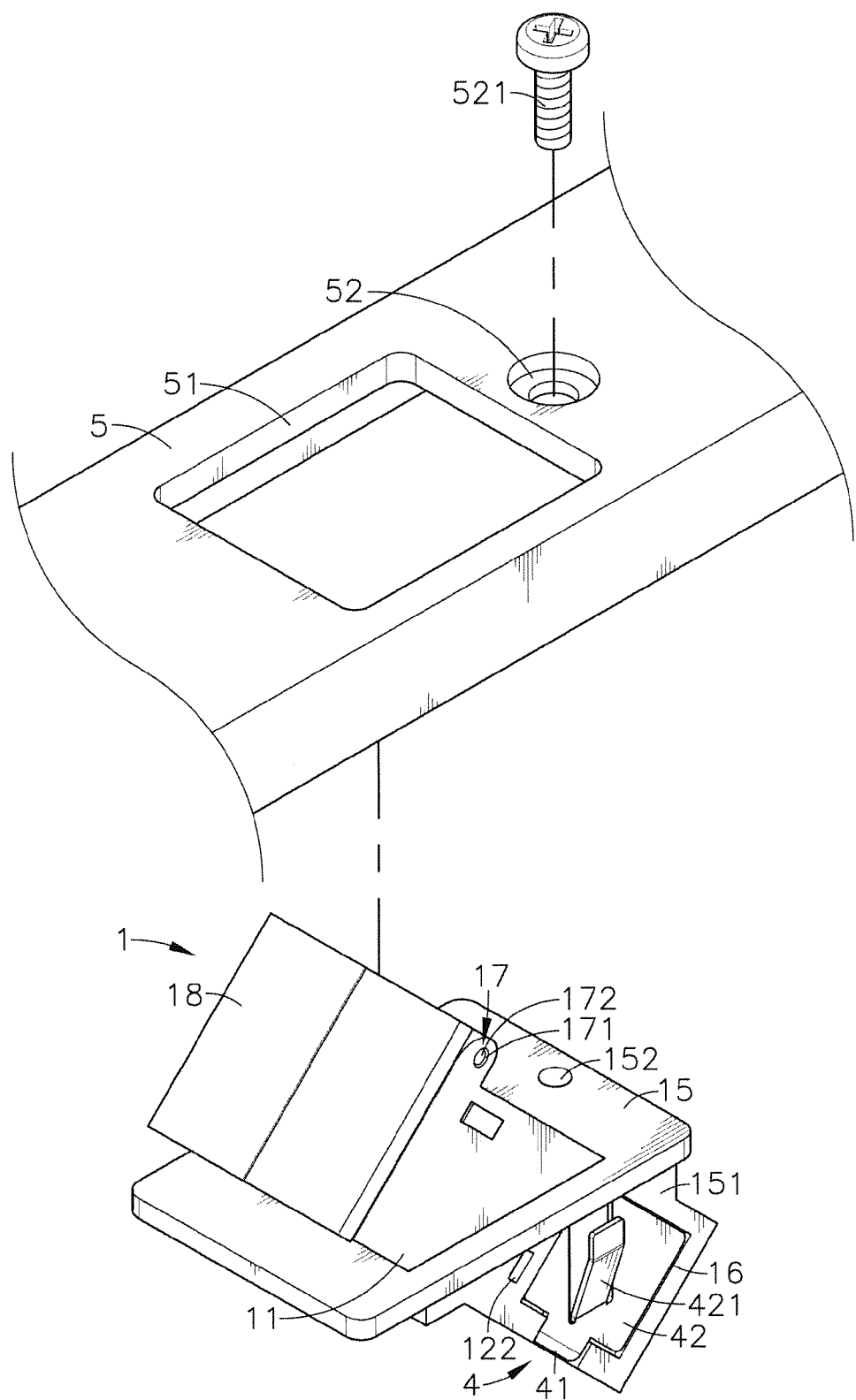
FIG. 11 is an exploded view illustrating another installation example of the present invention.
Figure 12:
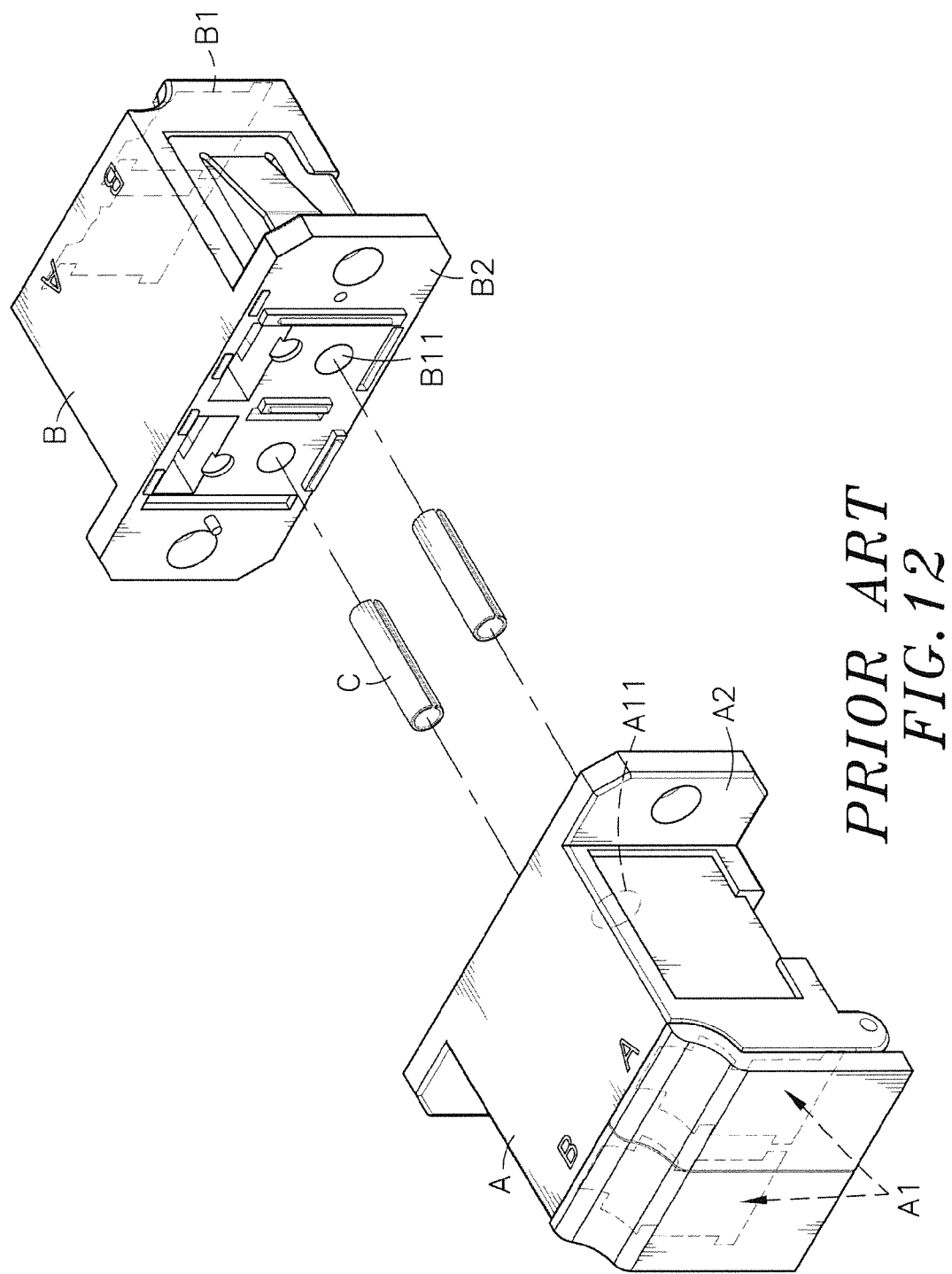
FIG. 12 is an exploded view of an optical fiber adapter according to the prior art.
Figure 13:
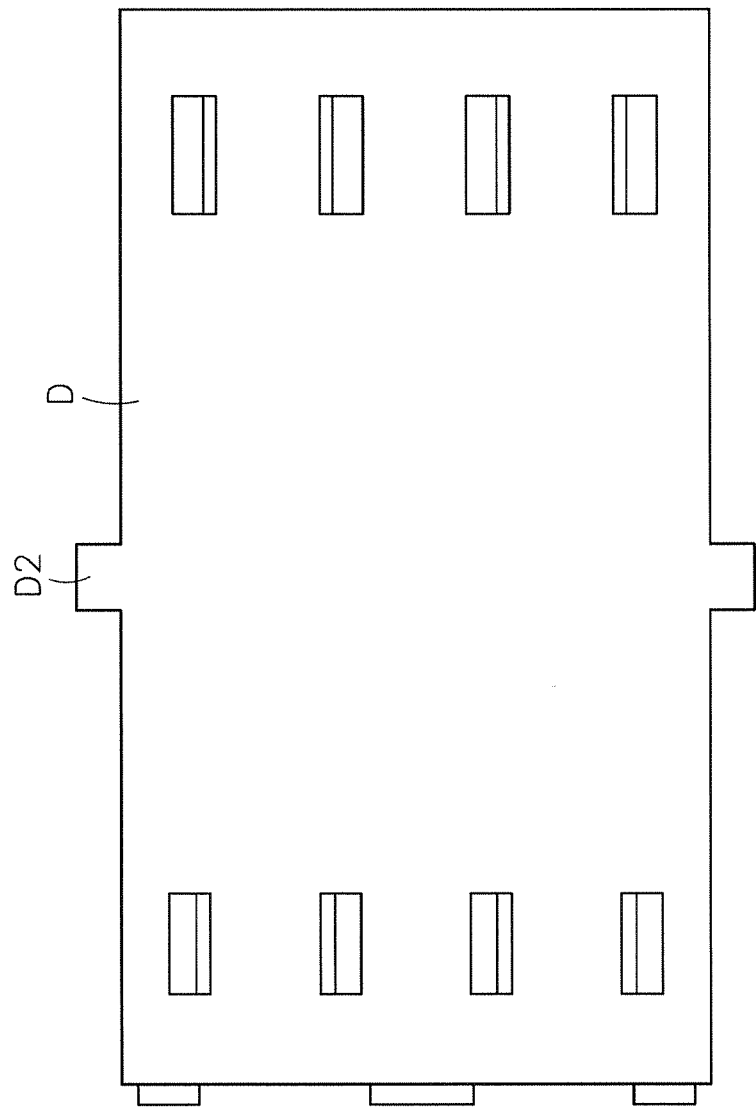
FIG. 13 is a top view of another design of optical fiber adapter according to the prior art.
Figure 14:
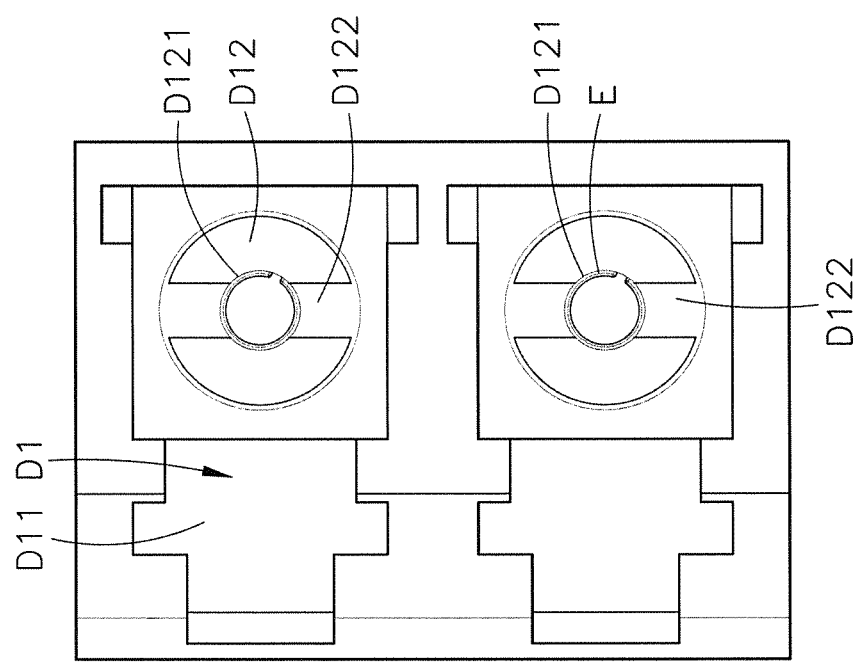
FIG. 14 is a side view of the optical fiber adapter shown in FIG. 13.
Figure 15:
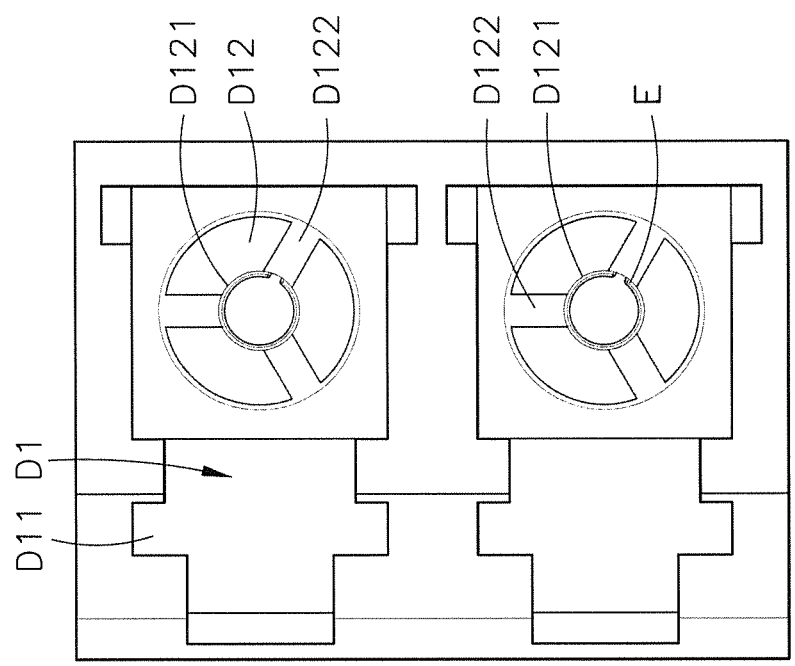
FIG. 15 is a side view of still another design of optical fiber adapter according to the prior art.
Figure 16:
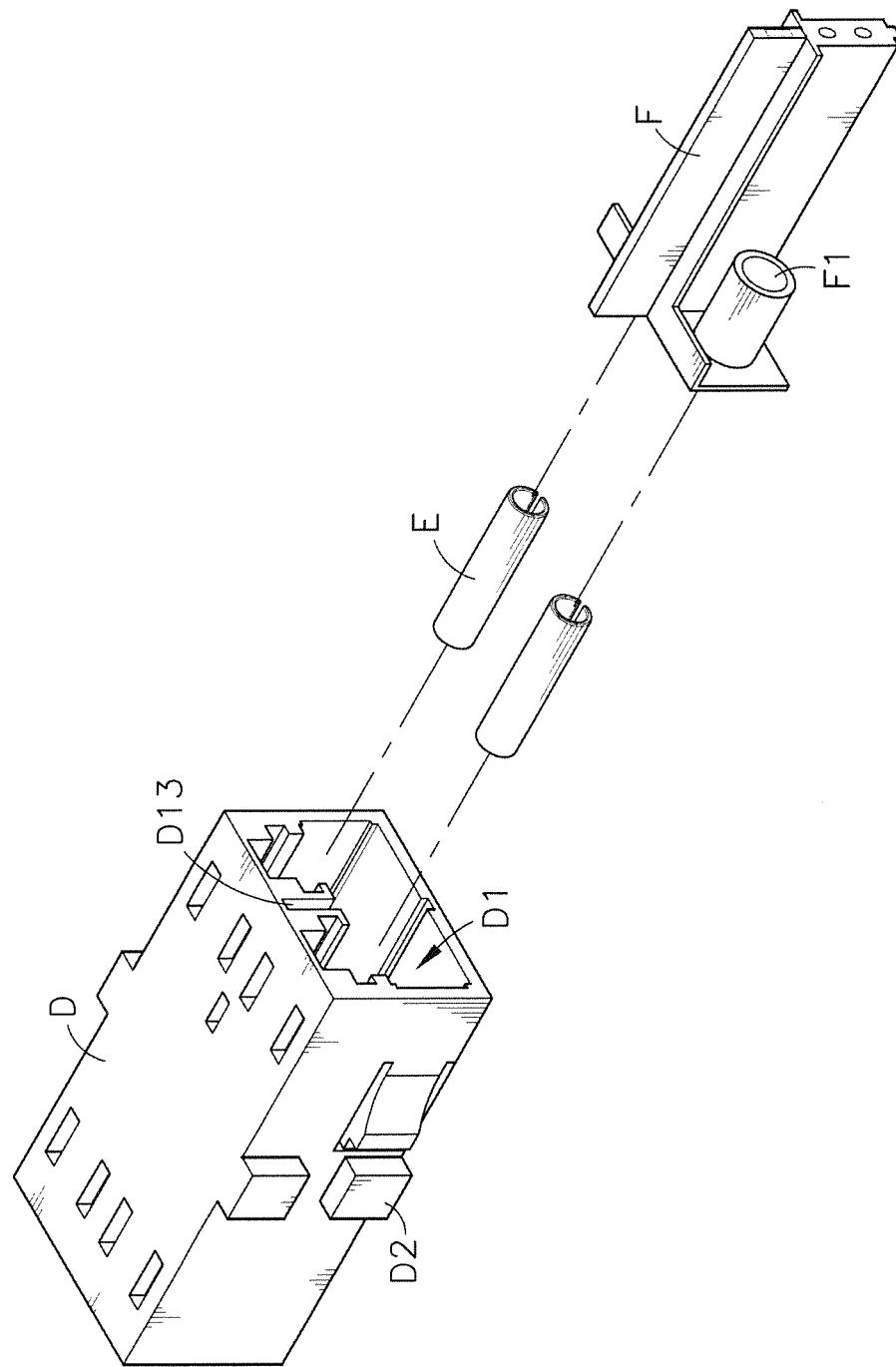
FIG. 16 is an exploded view of still another design of optical fiber adapter according to the prior art.
Figure 17:
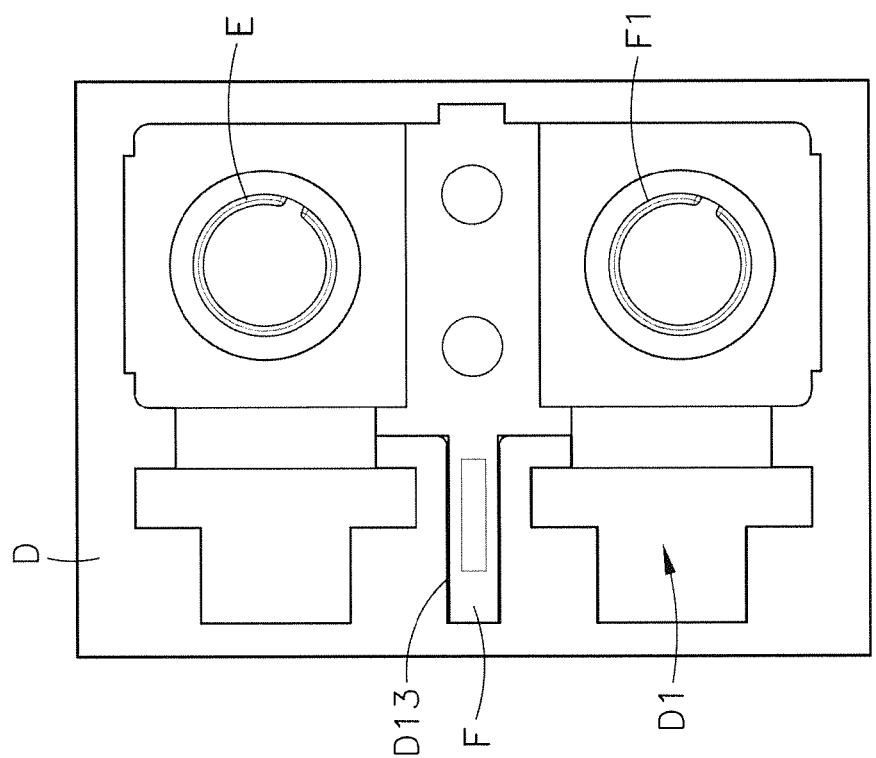
FIG. 17 is a side view of the optical fiber adapter shown in FIG. 16.
Figure 18:
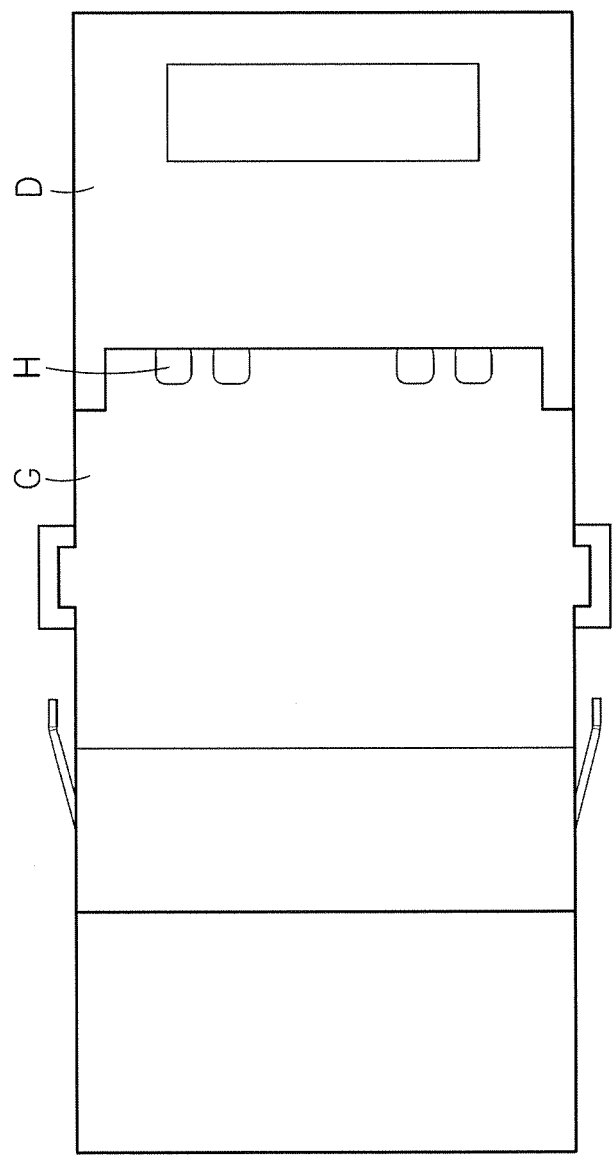
FIG. 18 is a top view of still another design of optical fiber adapter according to the prior art.
Figure 20:
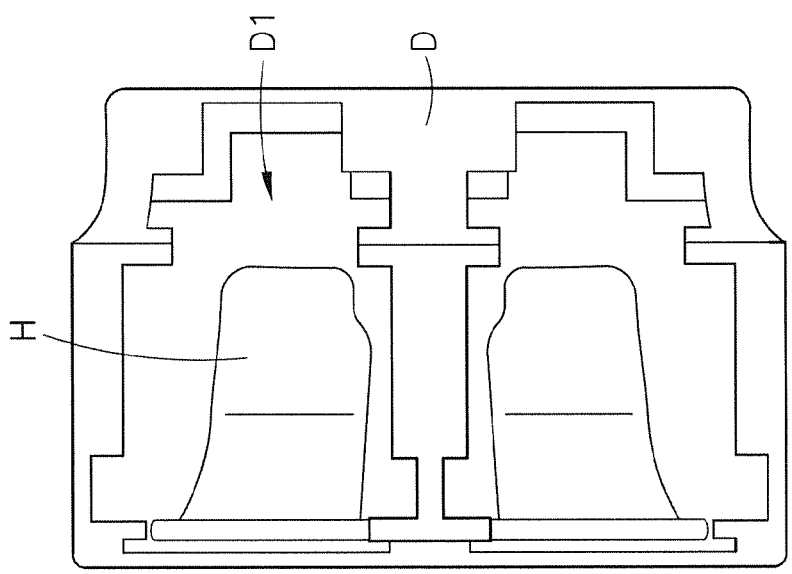
FIG. 20 is a side view of the optical fiber adapter shown in FIG. 18.

Referring to FIGS. 10 and 11, the mono-block type optical fiber adapter of the present invention is practical for installation in the housing 5 of a server, industrial computer, optical fiber splice box, digital junction box, optical fiber terminal box or any other optical fiber equipment for the connection of optical fiber connectors of an optical fiber communication system or network system.

During installation, downwardly insert the body shell 11 of the adapter body 1 into one mounting hole 51 on the face panel of the housing 5 to elastically deform the retaining strips 421 of the positioning member 4 and let the retaining strips 421 of the positioning member 4 be moved through the mounting hole 51. After the retaining strips 421 of the positioning member 4 passed through the mounting hole 51, the single piece wing 15 is abutted against one side, namely, the top side of the face panel of the housing 5 around the mounting hole 51, and the retaining strips 421 of the positioning member 4 immediately return to their former shape subject to their elastically deformable material property and become stopped at the bottom side of the face panel of the housing 5 around the mounting hole 51. At this time, the stepped block portions 151 are respectively stopped above the face panel of the housing 5 near the mounting hole 51, and thus the mono-block type optical fiber adapter is installed in the housing 5. Subject to the metallic material properties of the adapter body 1 and the positioning member 4, the mono-block type optical fiber adapter provides an excellent EMI (electromagnetic interference) and RFI (radio frequency interference) shielding effect to effectively suppress the energy of electromagnetic waves or radio frequency that passes through the insertion holes 120 of the adapter body 1 into the inside of the housing 5 and to prevent interference between electronic components in the housing 5, improving optical signal transmission quality and reliability.

Alternatively, the body shell 11 of the adapter body 1 can be upwardly inserted into the mounting hole 51 on the face panel of the housing 5 to abut the single piece wing 15 against the bottom side of the face panel of the housing 5 around the mounting hole 51, and the stepped block portions 151 are respectively stopped below the face panel of the housing 5 near the mounting hole 51, and then a screw 521 is mounted in a countersunk hole 52 on the face panel of the housing 5 and threaded into the mounting hole 152 at the single piece wing 15 of the body shell 11 of the adapter body 1 to affix the mono-block type optical fiber adapter to the housing 5.

Although particular embodiment of the invention have been described in detail for purposes of illustration, various modifications and enhancements may be made without departing from the spirit and scope of the invention. Accordingly, the invention is not to be limited except as by the appended claims.

What the invention claimed is:

1. A mono-block type optical fiber adapter, comprising:
  an adapter body, said adapter body comprising a body shell, at least one front-sided accommodation chamber and one rear-sided accommodation chamber respectively defined in opposing front and rear sides of said body shell, a partition wall defined inside said body shell between one said front-sided accommodation chamber and one respective said rear-sided accommodation chamber, and a tubular coupling portion extended from each said partition wall toward the inside of one respective said front-sided accommodation chamber and defining therein an axially extending passage hole that cuts through the respective said partition wall;
  at least one ferrule respectively mounted in the axially extending passage hole in each said tubular coupling portion of said adapter body, each said ferrule having a front end thereof positioned in the axially extending passage hole in one said tubular coupling portion of said adapter body and an opposite rear end thereof suspending in one said rear-sided accommodation chamber; and
  at least one ferrule holder respectively mounted in each said rear-sided accommodation chamber of said adapter body and sleeved onto the opposite rear end of one said ferrule, each said ferrule holder comprising a flat base frame stopped against one said partition wall of said adapter body, a coupling tube perpendicularly extended from one side of said flat base frame and sleeved onto one said ferrule, and an accommodation hole axially extending through said flat base frame and said coupling tube for accommodating the opposite rear end of one said ferrule;

wherein said adapter body further comprises two sliding grooves bilaterally and axially disposed in each said rear-sided accommodation chamber, and a plurality of escape holes respectively cut through two opposing lateral walls and a bottom wall of said body shell in communication with said at least one rear-sided accommodation chamber, an inside stop surface portion respectively defined in each said rear-sided accommodation chamber between an inner end of each said sliding groove and one respective said escape hole; each said ferrule holder further comprises two springy hook blocks symmetrically located at two opposite lateral sides of said flat base frame and respectively movable over one respective said inside stop surface portion into one respective said escape hole.

2. The mono-block type optical fiber adapter as claimed in claim 1, further comprising a positioning member fastened to said adapter body for securing said adapter body to an external equipment, wherein said adapter body further comprises at least one wing perpendicularly extended from said two opposing lateral walls of said body shell corresponding to said partition wall, and a plurality of recessed portions respectively located at said two opposing lateral walls and said bottom wall of said body shell and kept in communication with one other; said positioning member is a substantially U-shaped frame member fastened to said recessed portions of said adapter body, comprising a flat base panel, two side arms respectively extended from two opposite lateral sides of said flat base panel at right angles, and two retaining strips respectively extended from said two side arms.

3. The mono-block type optical fiber adapter as claimed in claim 1, wherein said adapter body further comprises a pivot unit located at an outside wall of said body shell adjacent to said at least one front-sided accommodation chamber, and a dust cover pivotally connected to said pivot unit and adapted to close said at least one front-sided accommodation chamber.

4. The mono-block type optical fiber adapter as claimed in claim 3, wherein said pivot unit comprises a plurality of axle holder blocks arranged in a line at said body shell of said adapter body, an axle transversely fastened to said axle holder blocks, and a plurality of torsion springs mounted on said axle and stopped between said body shell of said adapter body and said dust cover to hold said dust cover in a normally closed position; said dust cover comprises a plurality of barrels aligned in a line at one side thereof and pivotally coupled to said axle of said pivot unit.

5. The mono-block type optical fiber adapter as claimed in claim 1, further comprising a positioning member fastened to said adapter body for securing said adapter body to an external equipment, wherein said adapter body further comprises a wing extended from the periphery of said body shell and defining with said partition wall a predetermined contained angle, and a plurality of recessed portions respectively located at said two opposing lateral walls and said bottom wall of said body shell and kept in communication with one other; said positioning member is a substantially U-shaped frame member fastened to said recessed portions of said adapter body, comprising a flat base panel, two side arms respectively extended from two opposite lateral sides of said flat base panel at right angles, and two retaining strips respectively extended from said two side arms in direction toward said wing.

6. The mono-block type optical fiber adapter as claimed in claim 5, wherein said wing comprises two stepped block portions respectively connected to the periphery of said body shell of said adapter body at two opposite sides.

7. The mono-block type optical fiber adapter as claimed in claim 6, wherein said wing further comprises a mounting hole located near a top side thereof.

8. The mono-block type optical fiber adapter as claimed in claim 1, wherein each said tubular coupling portion of said adapter body defines a reduced orifice in a front end thereof in communication between said axially extending passage hole and one said front-sided accommodation chamber, and an inside annular stop edge disposed between said axially extending passage hole and said reduced orifice.

9. The mono-block type optical fiber adapter as claimed in claim 1, wherein each said ferrule holder further comprises a crevice cut through a middle part of the flat base frame thereof across one end of the accommodation hole thereof.

10. The mono-block type optical fiber adapter as claimed in claim 1, wherein said each said ferrule holder further comprises an orifice defined in a front end of said coupling tube remote from said flat base frame and disposed in axial alignment and communication with said accommodation hole, and an inside annular stop edge disposed between said accommodation hole and said orifice.

11. The mono-block type optical fiber adapter as claimed in claim 1, wherein said adapter body is made out of metal.

12. The mono-block type optical fiber adapter as claimed in claim 1, wherein each said ferrule holder is a one-piece plastic member.

* * * * *